(12) United States Patent
Parmeter et al.

(10) Patent No.: US 12,025,513 B2
(45) Date of Patent: Jul. 2, 2024

(54) MEASURING STRAIN THROUGHOUT A DIRECTIONAL WELL

(71) Applicant: HALLIBURTON ENERGY SERVICES, INC., Houston, TX (US)

(72) Inventors: Larry Parmeter, Broken Arrow, OK (US); Jeffery G. Frey, Broken Arrow, OK (US); Donn J. Brown, Broken Arrow, OK (US); Brett D. Leamy, Claremore, OK (US); Matthew King, Tulsa, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 125 days.

(21) Appl. No.: 16/623,056

(22) PCT Filed: Jan. 14, 2019

(86) PCT No.: PCT/US2019/013516
§ 371 (c)(1),
(2) Date: Dec. 16, 2019

(87) PCT Pub. No.: WO2020/149823
PCT Pub. Date: Jul. 23, 2020

(65) Prior Publication Data
US 2021/0333161 A1    Oct. 28, 2021

(51) Int. Cl.
*G01L 1/22* (2006.01)
*E21B 23/00* (2006.01)
*E21B 47/01* (2012.01)
*E21B 47/022* (2012.01)

(52) U.S. Cl.
CPC ............ *G01L 1/22* (2013.01); *E21B 23/00* (2013.01); *E21B 47/01* (2013.01); *E21B 47/022* (2013.01)

(58) Field of Classification Search
CPC ......... G01L 1/22; E21B 47/01; E21B 47/022; E21B 23/00
See application file for complete search history.

(56) References Cited

U.S. PATENT DOCUMENTS

| 4,324,297 | A | | 4/1982 | Denison | |
|---|---|---|---|---|---|
| 4,409,824 | A | * | 10/1983 | Salama | G01L 1/22 73/152.48 |
| 4,662,458 | A | | 5/1987 | Ho | |
| 4,896,722 | A | * | 1/1990 | Upchurch | E21B 47/18 166/250.15 |
| 5,018,389 | A | * | 5/1991 | Mraz | E21B 49/006 73/784 |

(Continued)

OTHER PUBLICATIONS

International Search Report and Written Opinion; PCT Application No. PCT/US2019/013516; dated Oct. 14, 2019.

(Continued)

*Primary Examiner* — Tara Schimpf
*Assistant Examiner* — Yanick A Akaragwe
(74) *Attorney, Agent, or Firm* — NOVAK DRUCE CARROLL LLP

(57) ABSTRACT

A wellbore environment including a downhole tool coupled with a conveyance and operable to be disposed within a wellbore, at least one strain measurement devices coupled with a surface of the downhole tool; and a control facility communicatively coupled with the at least one strain measurement device.

16 Claims, 5 Drawing Sheets

(56) References Cited

U.S. PATENT DOCUMENTS

| | | | | |
|---|---|---|---|---|
| 5,394,823 | A | * | 3/1995 | Lenze ................ E21B 17/1035 285/119 |
| 5,973,270 | A | * | 10/1999 | Keller ................ E21B 17/1035 174/136 |
| 2006/0289074 | A1 | * | 12/2006 | Eriksson ............. B23K 26/262 138/171 |
| 2008/0314578 | A1 | * | 12/2008 | Jackson ................ E21B 43/124 166/68 |
| 2015/0107824 | A1 | * | 4/2015 | Signorelli ........... E21B 41/0085 166/244.1 |
| 2015/0129206 | A1 | * | 5/2015 | Harman ................ E21B 47/135 166/66.4 |
| 2015/0218934 | A1 | | 8/2015 | Turner |
| 2016/0040525 | A1 | | 2/2016 | Lange et al. |
| 2016/0265287 | A1 | * | 9/2016 | Newman ............. E21B 17/1078 |
| 2017/0218744 | A1 | | 8/2017 | Dykstra et al. |
| 2019/0226295 | A1 | * | 7/2019 | Zonoz .................. E21B 33/038 |
| 2019/0323326 | A1 | * | 10/2019 | Morrison, III ........ E21B 43/162 |
| 2019/0353630 | A1 | * | 11/2019 | Vepsäläinen .......... E21B 47/113 |

OTHER PUBLICATIONS

Office Action; Canadian Application No. 3,118,823; dated Mar. 14, 2023.

* cited by examiner

MEASURING STRAIN THROUGHOUT A DIRECTIONAL WELL

CROSS-REFERENCE TO RELATED APPLICATIONS

This application is a national stage entry of PCT/US2019/013516 filed Jan. 14, 2019, said application is expressly incorporated herein in its entirety.

FIELD

The present disclosure relates generally to a method and system for evaluating strain experienced by a tool within a wellbore. In particular, the present disclosure relates to methods for monitoring downhole equipment, developing a map of the wellbore and adjusting course to reduce strain.

BACKGROUND

Wellbores, such as those used in oil and gas extraction, are typically drilled starting from a central location within a hydrocarbon bearing zone. However, drilling straight down into the earth formation from a single location does not necessarily provide the greatest opportunity for hydrocarbon extraction. As such, it is common practice to drill down to a predetermined depth, then direct the drill towards a predetermined radius and guide the drill to an ideal hydrocarbon producing zone, creating a directional well. This practice can result in a single wellbore having various turns and providing multiple orientations within the earth formation.

BRIEF DESCRIPTION OF THE DRAWINGS

Implementations of the present technology will now be described, by way of example only, with reference to the attached figures, wherein.

DETAILED DESCRIPTION

Figure 1:
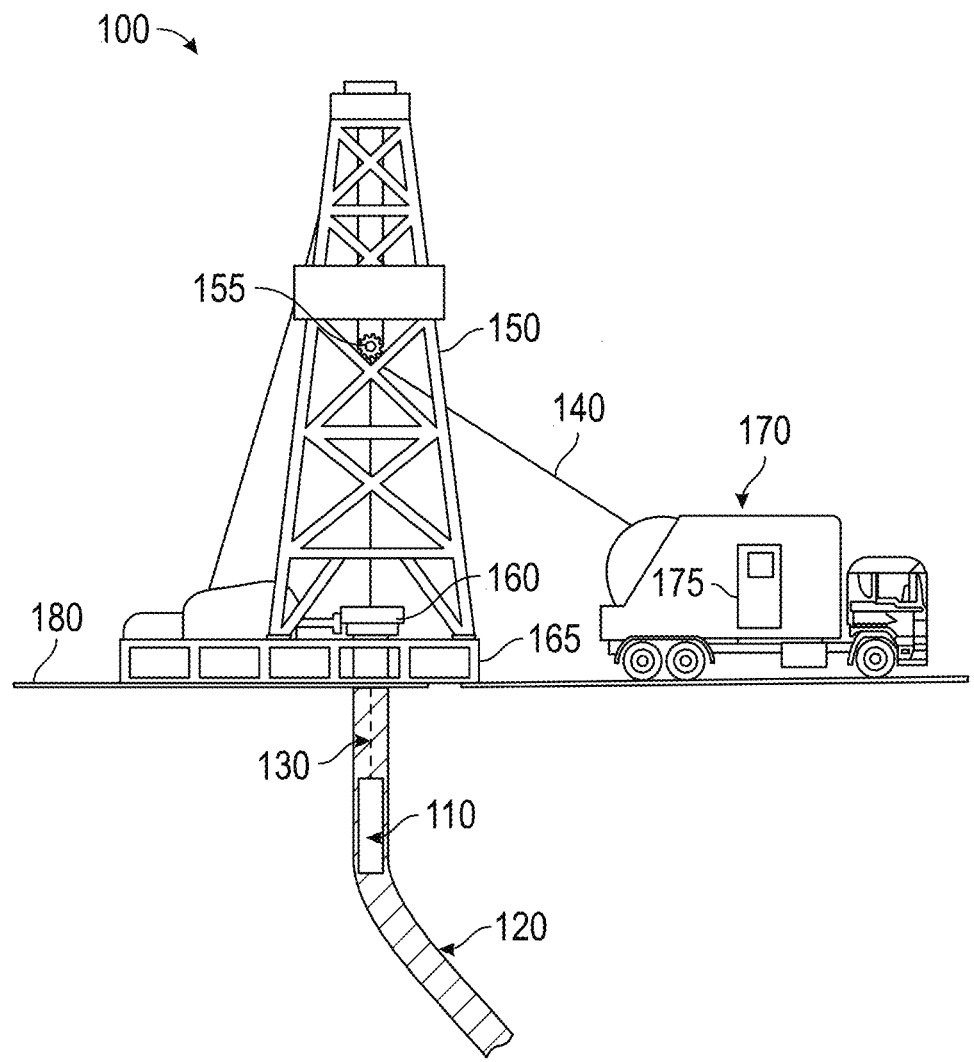
FIG. 1 is a schematic diagram of a directional wellbore environment wherein the disclosed measurement device and method can be implemented.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Various tools can be used downhole throughout the life of an oil well. As these tools descend into the wellbore they can experience strain, particularly as they move through the various turning points within the wellbore. The strain can cause significant damage to the tools, resulting in a shorter useful lifespan. Additionally, despite having drilled the wellbore, determining the angle at which the wellbore actually curves or bends within the earth formation is typically an estimation, therefore it is difficult to determine the exact forces which will be exerted on the tools disposed downhole and how best to prevent damage to those tools.

Disclosed herein is a method and system for determining strain placed on downhole tools as they move through various wellbore orientations. For example, there can be numerous changes in orientation throughout the length of a wellbore, based on the location of hydrocarbons. As a downhole tool is moved throughout the wellbore it is critical to know if there is increased strain on the tool. In at least one example, the strain exerted on a downhole tool can be measured using one or more strain gauges coupled with the downhole tool at one or more predetermined locations. The strain gauge can be communicable with a control or processing facility, and can be configured to provide both delayed and real-time analysis of the strain experienced by the downhole tool. The information gathered can then be used to create a map of the wellbore.

As described above, typical hydrocarbon producing wells are drilled straight down into an earth formation to a predetermined depth, the drill is then directed horizontally at a predetermined radius and guided to a potential hydrocarbon producing zone. Such drilling techniques are considered "horizontal drilling." In particular, the term "horizontal drilling" as used herein refers to the deliberate shifting of a well path from the vertical. In at least one example, multiple horizontal wellbores can be drilled at various angles from a single initial location. Various means can be used to guide the drill a desired direction or to a desired location; however, due to the changes in earth formation as the wellbore descends, a true and accurate map of each turn of the wellbore is difficult to obtain. Without knowing the exact degree of the bend the downhole tools must pass through it is impossible to know what strain the tools will be subjected to. Generally, downhole tools are designed to operate while positioned within a straight (vertical or horizontal) environment. Operation of tools while in a bend can cause the tool to undergo extreme levels of stress and can cause damage including, but not limited to, motor bind, motor damage, carbide bearing fracture, strained connections, broken connections, premature bearing failure, and the like. Such damage can significantly shorten the life span of the tool or in extreme cases can cause complete tool failure.

One aspect of the present disclosure describes a method and system for measuring the strain downhole tools are exposed to for each bend within the wellbore. Such data can allow for the calculation of the angle of each bend the equipment will travel through with increased accuracy. In particular, a system for measuring strain on tools within a wellbore as described herein can include a strain measurement device coupled with a downhole tool in order to measure the strain placed on the tool as it moves throughout the wellbore.

For example, and with reference to FIG. 1, the disclosed system may be directly or indirectly coupled with one or more components or pieces of equipment associated with an exemplary directional wellbore environment 100, according to one or more embodiments. FIG. 1 illustrates a schematic diagram of an exemplary directional wellbore operating environment 100 in which the measurement system and methods can be used. The environment 100 can include a downhole tool 110, downhole tools compatible with the present invention can include, but are not limited to, artificial lift tools, pumps (including, but not limited to, submersible pumps, and electric submersible pumps), slick line tools, wireline tools, motors, plugs, wellbore isolation devices, fracking tools, completion tools, bottom hole assembly tools, geophysical characterization tools, and any other wellbore operational tool. In at least one example, the downhole tool 110 can include a strain measurement device coupled with the downhole tool 110 and operable to provide communications between the surface equipment 170 and the downhole tool 110. In at least one example, the strain measurement device can be a strain gauge.

The directional wellbore environment 100 can include a drilling platform 165 equipped with a derrick 150 that supports a hoist 155. The downhole tool 110 can be lowered through the rotary table 160 into the wellbore 120. The exemplary system disclosed herein can be used with any type of downhole tools as described in greater detail above. The downhole tool 110 can be conveyed into the wellbore 120 by any suitable conveyance 130 including, but not limited to, wireline logging cable, slickline, tubing, coiled tubing, pipe, metallic wire, non-metallic wire, and composite wire. The conveyance 130 can also include a cable, which can be used to facilitate communications between the downhole tool 110 and surface equipment 170.

Typically, the downhole tool 110 is lowered into the wellbore 120 and subsequently used to perform various operations throughout one or more desired areas downhole. As shown in FIG. 1, the wellbore can include one or more bends and changes in orientation. As the downhole tool 110 moves through the wellbore the tool can pass through one or more bends. While a small amount of bend in some downhole tools can be tolerated or even beneficial (for example, slight bend can reduce vibration within a centrifugal multi-stage pump), a large amount of bend can cause failure within the tool. Specifically, large bends within the wellbore can put excess strain on the tool which can cause various mechanical issues within the downhole tool. In order to monitor the bend and the amount of strain placed on the downhole tool 110 a strain measurement device can be implemented. For example, a strain measurement device can be coupled with the downhole tool 110 to measure and, in some embodiments, relay information to a control or processing facility, as described in more detail herein.

The downhole tool 110 and strain measurement device may be communicatively coupled with surface equipment, such as a control or processing facility 170, at the surface 180 via a cable which can, in at least one example, be a part of the conveyance 130. While the control or processing facility 170 is depicted in FIG. 1 as a truck the control or processing facility 170 may be any structure without departing from the spirit and scope of the present disclosure. In at least some instances, the downhole tool 110 may also receive power from the control or processing facility 170 via the cable.

The control or processing facility 170 can include at least one computer system 175 communicatively coupled with the downhole tool 110. The computer system 175 can be operable to send and receive signals to and from the downhole tool 110. The computer system 175 may be further capable of obtaining strain measurements from a strain measuring device coupled with the downhole tool 110. In at least one example, the control or processing facility 170 and/or the computer system 175 may be located at the surface 180 adjacent to the wellbore 120, as depicted in FIG. 1. In an alternative example, the control or processing facility 170 and/or the computer system 175 can be located at a remote location and the data can be transferred by either wired or wireless means.

Modifications, additions, or omissions may be made to FIG. 1 without departing from the spirit and scope of the present disclosure. For example, FIG. 1 depicts components of the directional wellbore environment 100 in a particular configuration. However, any suitable configuration of components may be used. Furthermore, fewer components or additional components beyond those illustrated may be included in the directional wellbore environment 100 without departing from the spirit and scope of the present disclosure. It should be noted that while FIG. 1 generally depicts a land-based operation, those skilled in the art would readily recognize that the principles described herein are equally applicable to operations that employ floating or sea-based platforms and rigs, without departing from the scope of the disclosure. Also, even though FIG. 1 depicts a directional wellbore, the present disclosure is equally well-suited for use in wellbores having other orientations, including vertical wellbores, horizontal wellbores, slanted wellbores, multilateral wellbores, and the like.

Additionally, while FIG. 1 depicts a directional wellbore operation environment, the systems and methods described herein for strain measurement can also be implemented in a directional drilling environment without departing from the scope and spirit of the disclosure. For example, the strain measurement device can be used in a measurement-while-drilling (MWD) system. In an MWD system, the strain measurement device can be coupled with a drill string to provide either delayed or real-time data regarding the bend angle of the wellbore as it is drilled. In at least one example, if the measurement device is coupled with a drilling tool the measurements taken during the drilling process can provide a more detailed map of the wellbore environment.

Figure 2:
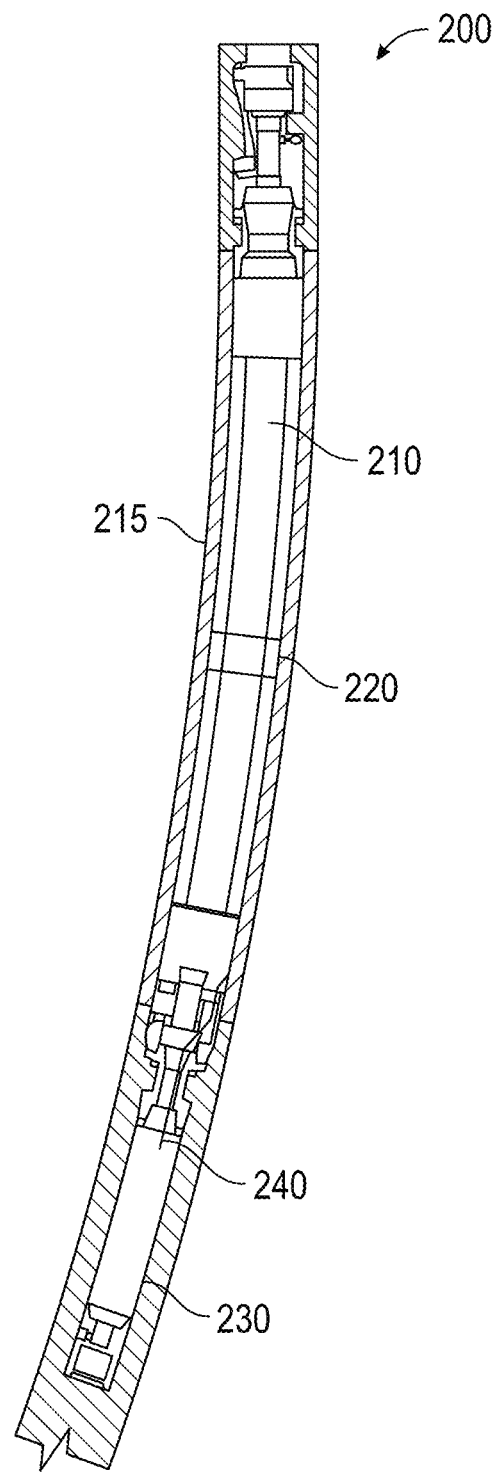
FIG. 2 illustrates a cross-sectional view of an exemplary downhole tool compatible with the disclosed strain gauge.

In at least one example, the strain experienced by the downhole tool as the tool moves throughout the wellbore can be measured using a strain gauge coupled with a surface of the downhole tool. Any suitable strain gauge can be used including, but not limited to, general purpose precision strain gauges, transducer quality strain gauges, karma strain gauges, bonded foil strain gauges, and the like. FIG. 2 illustrates a cross-sectional view of a downhole tool compatible with the methods and systems described herein. The downhole tool 200 as shown in FIG. 2 can include a motor 210, the motor can further comprise a lamination stack. In at least one example, the laminations can be loosely stacked onto a mandrel and then compressed inside a housing using a snap ring to hold the laminations in place. A strain measurement device 220, such as a strain gauge, can then be coupled with a surface of the motor. Once attached, the strain measurement device can be used to determine the amount of bend the motor experiences as it moves throughout the wellbore 215. For example, the strain measurement device can measure the bend of the tool by determining the change in resistance experienced by the strain gauge. The downhole tool 200 can further include a sensor 230, located at the distal end of the downhole tool 200, and coupled with a wire lead 240 to provide information feedback from both the sensor 230 and the strain measurement device 220.

While FIG. 2 depicts a motor having a single strain measurement device, it should be noted that multiple strain measurement devices can be placed at varying locations along the length of the downhole tool 200 in order to obtain data regarding the strain experienced by the downhole tool as it moves throughout the wellbore. The strain gauge 220 can be coupled with the downhole tool 200 using any suitable coupling means. In at least one example, the strain gauge can be adhered to a surface of the downhole tool using an adhesive. In an alternative example, the strain gauge can be bonded to a surface of the downhole tool via a heating or pressure process.

Figure 3:
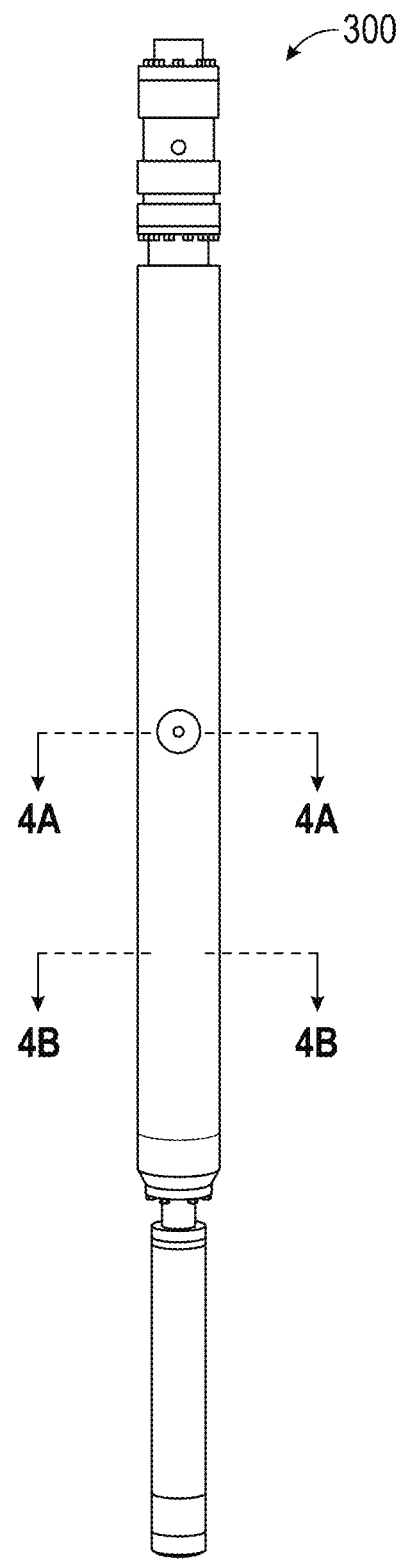
FIG. 3 illustrates an exemplary downhole tool with the housing removed.

FIG. 3 illustrates an exemplary downhole tool 300, having one or more strain measurements devices disposed at a predetermined location along the length of the downhole tool. While FIG. 3 illustrates a schematic diagram of a tool without a housing, it should be readily recognized by those having skill in the art that in at least some examples the tool can be disposed within a housing without departing from the scope of the disclosure. For example, the housing can be included in order to provide protection for both the tool and strain gauge(s) as the tool travels throughout the wellbore. Axes A-A and B-B are shown along the length of downhole tool 300, cross sectional views across each axis A-A and B-B are provided as FIGS. 4A and 4B, respectively.

Figure 4A:
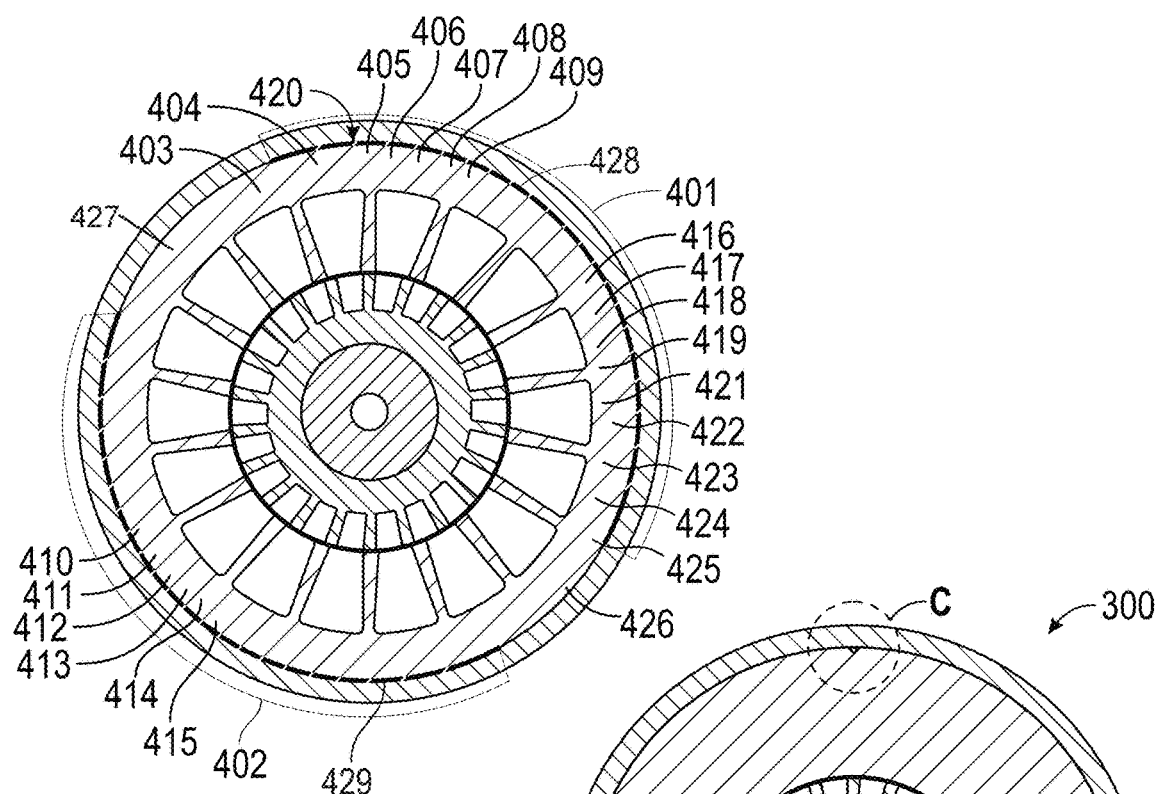
FIG. 4A illustrates a cross-sectional view of the downhole tool of FIG. 3 at line A-A.

FIG. 4A illustrates a cross-sectional view of the downhole tool 300 taken across axis A-A as shown in FIG. 3. A strain measurement device 420, such as a strain gauge, is mounted to a surface of the downhole tool. As shown, the strain measurement device 420 is mounted on a flat, rigid surface of the downhole tool. Providing a flat, rigid surface to mount the strain measurement device is essential in obtaining an accurate reading from the gauge. In the example shown in FIG. 4A, a predetermined length of laminations was compressed and laser welded together at one or more predetermined locations. A flat surface can be milled into a surface of the welded laminations to provide the mounting surface for the strain gauge. For instance, and as illustrated in FIG. 4A, the welded laminations (e.g., lamination(s) 403-419 and 421-427) may include one or more flat surfaces (e.g., flat surface 428 of the flat surfaces 401 and flat surface 429 of the flat surfaces 402). In an alternative example, a flat surface for the strain measurement device can be created on a separate flat surface and then coupled with the downhole tool.

Figure 4B:
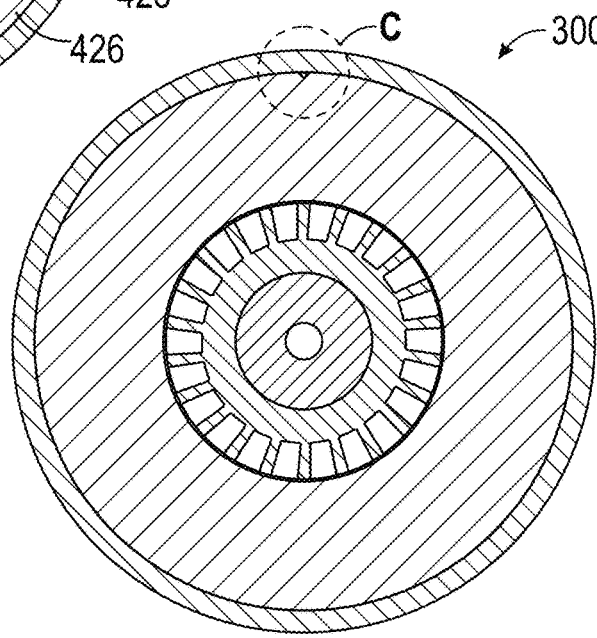
FIG. 4B illustrates a cross-sectional view of the downhole tool of FIG. 3 at line B-B.
Figure 4C:
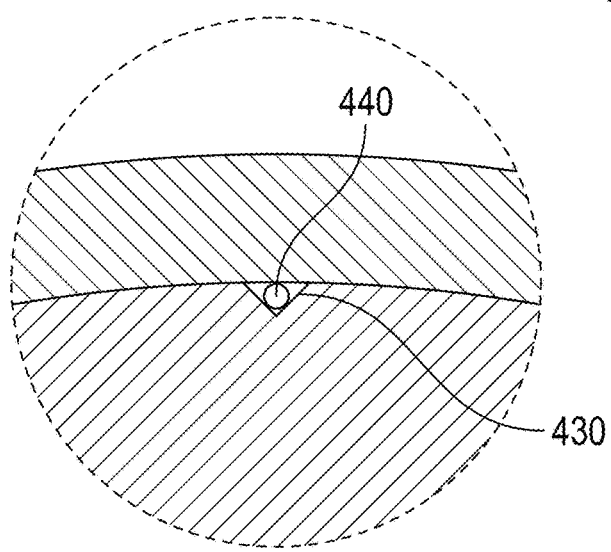
FIG. 4C illustrates an enlarged view of the encircled portion C of FIG. 4B.

FIG. 4B illustrates a cross-sectional view of the downhole tool 300 taken across axis B-B. As shown, in this example a notch can be provided at encircled portion C to allow for a wire to run along the length of the tool. In at least one example, the wire can be a gauge wire. An enlarged view of encircled portion C is shown in FIG. 4C. As shown, notch 430 provides a gap for wire 440 to rest along the downhole tool 300 to protect the wire 440 from potential damaged as the tool moves and bends within the wellbore. In the present example, the notch 430 can be cut along the length of the laminations to form a continuous keyway extending the length of the tool. The keyway can be designed to align with the strain gauge such that the gauge wire 440 can run from a sensor gauge at the distal end of the downhole tool to the one or more strain measurement devices. The strain measurement device and wire can be held into place using any suitable means prior to the downhole tool being inserted into the housing. In the present example, the strain measurement device is placed centrally within the full lamination stack, as shown in FIG. 3. Additional laminations can then be added to obtain the desired length of the stator assembly. While reference number 440 is referred to as a gauge wire with respect to FIG. 4C, in at least one example reference number 440 can be a strain gauge. For example, a strain gauge 440 can be placed within a notch 430 cut along the length of the laminations as shown in FIG. 4C to allow the strain gauge to be encased within a housing for protection. Additionally, placing the strain gauge within a notch in the laminations can allow for the collection of more accurate measurements due to the strain gauge's central location within the tool.

If more extensive data is desired, additional strain measurement devices can be placed at various locations along the length of the downhole tool. Each of the strain measurement devices can be coupled to one another using a wire, such as a gauge wire as described above with respect to FIG. 4B. The data collected from the strain measurement devices can then be transmitted to the surface for compilation and analysis. The strain measurement device as described above can be used to provide bend data as the motor is moved throughout the wellbore. In an alternative, as described above, the strain measurement devices can be used to obtain real-time data as a drill string creates the wellbore.

Figure 5:
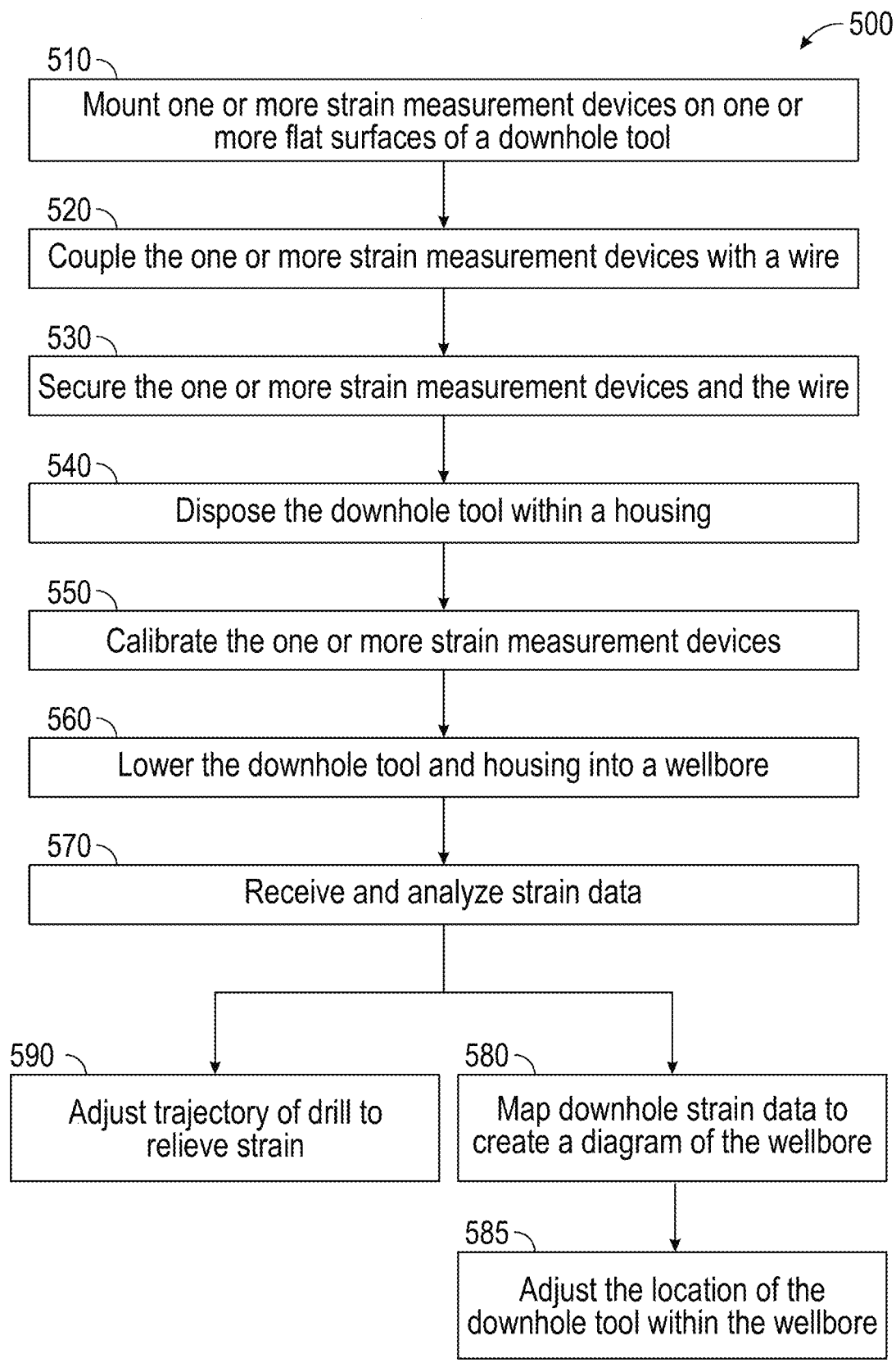
FIG. 5 is a flow chart showing a method for using measuring strain in accordance with the system herein.

A method 500 for measuring strain as described above is shown in FIG. 5. The method 500 can begin at block 510 wherein one or more strain measurement devices are mounted onto one or more flat surfaces of a downhole tool. As described above, the strain measurement device can be a strain gauge. At block 520, the strain measurement device can be coupled with a wire, such as a gauge wire, which can be run along the length of the downhole tool. Additionally, if multiple strain measurement devices are used, the strain measurement devices can be coupled together via the wire. At block 530, the strain measurement devices can be secured to the downhole tool using any suitable means, such as those described in greater detail above. Once the strain measurement devices are attached to the downhole tool, at block 540 the downhole tool can be disposed within a protective housing.

At block 550, the strain measurement devices can be calibrated. In at least one example, the strain measurement devices can be calibrated mathematically, without physically placing strain on the tool. In an alternative example, the strain measurement device can be calibrated experimentally. Using the example described in FIG. 3, if the downhole tool is a motor, a strain measurement device, or strain gauge, can be calibrated by supporting the motor at each end and applying a force to the center of the motor. The deflection of the motor, and change in resistance of the strain gauge, can then be recorded and a calibration curve can be created using the recorded data. After the strain measurement devices are calibrated, at block 560 the downhole tool and housing can be lowered into a wellbore.

As the downhole tool moves throughout the wellbore, the strain measurement devices can monitor the bend at which the tool moves through the wellbore in terms of strain placed on the downhole tool. This is calculated by determining the change in resistance as recorded by the strain measurement device. The recorded resistance values can then be amplified and transmitted uphole, to a control or processing facility as described with respect to FIG. 1. The data can be transferred uphole using any suitable method including, but not limited to, via a power cable, an optical cable, or any other data transfer method capable of being used downhole, as described in more detail with respect to FIG. 1. The control or processing facility can either be above ground at the wellbore location or at a remote location where the resistance data can be read using an Ohm meter. At block 570, the transmitted data is received, read, and analyzed to determine the amount of strain the downhole tool experienced at each location within the wellbore. The transmitted data can then be converted to determine the degree, or amount of bend, within the wellbore.

At block 580, this data can be used to create a more accurate map of the shape and turns within the wellbore. At block 585, the location of the downhole tool can be adjusted. For example, based on the data collected, the location of the downhole tool within the wellbore can be adjusted in order to allow the tool to operate under less strain. Adjusting the location of the downhole tool can extend the life of the tool by ensuring excess strain is not experienced during operation.

In an alternative example, at block 590, if the downhole tool is a part of a drill string, the data collected by the strain measurement device can be used to monitor and adjust the trajectory of the drill as it descends through the earth formation. Such adjustments can be made in order to prevent significant bend on the various tools which may be disposed downhole throughout the life of the wellbore.

Numerous examples are provided herein to enhance understanding of the present disclosure. A specific set of statements are provided as follows.

Statement 1: A system comprising a downhole tool coupled with a conveyance; one or more strain measurement devices mounted on a surface of the downhole tool; and a control facility communicatively coupled with the one or more strain measurement devices.

Statement 2: A system in accordance with Statement 1, wherein a wire is coupled with the one or more strain measurement devices and extends from a first end of the downhole tool through the length of the conveyance.

Statement 3: A system in accordance with either of Statement 1 or Statement 2, wherein when multiple strain measurement devices are present, each strain measurement device is coupled to one another via the wire.

Statement 4: A system in accordance with any of Statements 1-3, wherein the one or more strain measurement devices are a strain gauge.

Statement 5: A system in accordance with any of Statements 1-4, wherein the wire is a gauge wire.

Statement 6: A system in accordance with any of Statements 1-5, wherein the one or more strain measurement devices are operable to record strain placed on a downhole tool.

Statement 7: A system in accordance with any of Statements 1-6, wherein the control facility is operable to analyze the strain data received from the one or more strain measurement devices.

Statement 8: A system in accordance with any of Statements 1-7, wherein the downhole tool is a wellbore operational tool.

Statement 9: A system in accordance with any of Statements 1-8, wherein the wellbore operational tool is selected from the group comprising an artificial lift tool, a pump, a slick line tool, a wireline tool, a motor, a plug, a wellbore isolation device, a fracking tool, a completion tool, a bottom hole assembly tool, a geophysical characterization tool, and combinations thereof.

Statement 10: A system in accordance with any of Statements 1-9, wherein the wellbore operational tool is a pump.

Statement 11: A system in accordance with any of Statements 1-10, wherein the pump is a submersible pump.

Statement 12: A system in accordance with any of Statements 1-7, wherein the downhole tool is a drilling tool.

Statement 13: A system in accordance with any of Statements 1-12, wherein the downhole tool further comprises a motor, and wherein the strain measurement device is mounted on a surface of the motor.

Statement 14: A method for determining bend within a wellbore, the method comprising mounting at least one strain measurement device to a surface of a downhole tool; lowering, via a conveyance, the downhole tool into a wellbore; receiving, at a control facility, strain data from the at least one strain measurement device; analyzing, via a computing device, the strain data; and adjusting the position of the downhole tool based on the strain data.

Statement 15: A method in accordance with Statement 14, further comprising running a wire from a first end of the downhole tool, along the length of the tool, and through the conveyance.

Statement 16: A method in accordance with Statement 14 or Statement 15, further comprising mounting a plurality of strain measurement devices on the downhole tool, each of the plurality of strain measurement devices are coupled to one another via the wire.

Statement 17: A method in accordance with any of Statements 14-16, further comprising calibrating the at least one strain measurement device prior to lowering the downhole tool into the wellbore.

Statement 18: A method in accordance with any of Statements 14-17, wherein when the downhole tool is a drill, further comprising adjusting the trajectory of the drill based on the analyzed strain data.

Statement 19: A method in accordance with any of Statements 14-18, further comprising moving the downhole tool to a different location within the wellbore prior to operating the downhole tool.

Statement 20: A method in accordance with any of Statements 14-19, wherein the at least one strain measurement device is a strain gauge.

Statement 21: A method in accordance with any of Statements 14-20, wherein the downhole tool is a wellbore operational tool.

Statement 22: A method in accordance with any of Statements 14-21, wherein the wellbore operational tool is selected from the group comprising an artificial lift tool, a pump, a slick line tool, a wireline tool, a motor, a plug, a wellbore isolation device, a fracking tool, a completion tool, a bottom hole assembly tool, a geophysical characterization tool, and combinations thereof.

Statement 23: A method in accordance with any of Statements 14-22, wherein the wellbore operational tool is a pump.

Statement 24: A method in accordance with any of Statements 14-23, wherein the pump is a submersible pump.

Statement 25: A method in accordance with any of Statements 14-20, wherein the downhole tool is a drilling tool.

Statement 26: A method in accordance with any of Statements 14-25, wherein the downhole tool further comprises a motor, and wherein the strain measurement device is mounted on a surface of the motor.

Statement 27: A method in accordance with any of Statements 14-26, wherein the wellbore is a directional wellbore.

Statement 28: A wellbore environment comprising a downhole tool coupled with a conveyance and operable to be disposed within a wellbore; at least one strain measurement device coupled with a surface of the downhole tool; and a control facility communicatively coupled with the at least one strain measurement device.

Statement 29: A wellbore environment in accordance with Statement 28, wherein the at least one strain measurement device is operable to record a degree of bend in the downhole tool as it moves throughout the wellbore.

Statement 30: A wellbore environment in accordance with Statement 28 or Statement 29, further comprising a computing device communicatively coupled with the control facility, the computing device further comprising at least one processor and a memory storing instructions thereon executable by the at last one processor to receive bend data from the at least one strain measurement device via the control facility, analyze the bend data to determine an amount of strain placed on the downhole tool, and adjust the position of the downhole tool within the wellbore to reduce the amount of strain on the downhole tool.

Statement 31: A wellbore environment in accordance with Statements 28-30, wherein the at least one strain measurement device is a strain gauge, and wherein the bend data includes a change in resistance as measured by the at least one strain gauge.

Statement 32: A wellbore environment in accordance with Statements 28-31, wherein the downhole tool is a wellbore operational tool, and wherein the instructions further cause the processor to move the wellbore operational tool to a location within the wellbore where the downhole tool experiences less strain, and operate the wellbore operational tool.

Statement 33: A wellbore environment in accordance with Statements 28-32, wherein the downhole tool is a drill, and wherein the instructions further cause the processor to adjust the trajectory of the drill within the wellbore.

Statement 34: A wellbore environment in accordance with Statements 28-33, wherein the downhole tool is a wellbore operational tool.

Statement 35: A wellbore environment in accordance with Statements 28-34, wherein the wellbore operational tool is selected from the group comprising an artificial lift tool, a pump, a slick line tool, a wireline tool, a motor, a plug, a wellbore isolation device, a fracking tool, a completion tool, a bottom hole assembly tool, a geophysical characterization tool, and combinations thereof.

Statement 36: A wellbore environment in accordance with Statements 28-35, wherein the wellbore operational tool is a pump.

Statement 37: A wellbore environment in accordance with Statements 28-36, wherein the pump is a submersible pump.

Statement 38: A wellbore environment in accordance with Statements 28-37, wherein the downhole tool is a drilling tool.

Statement 39: A wellbore environment in accordance with Statements 28-38, wherein the downhole tool further comprises a motor, and wherein the strain measurement device is mounted on a surface of the motor.

Statement 40: A wellbore environment in accordance with Statements 28-39, wherein the wellbore is a directional wellbore.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A system comprising:
an electric submersible pump coupled with a conveyance;
a plurality of laminations of predetermined length that are laser welded together at one or more locations of the electric submersible pump;
a plurality of flat surfaces milled into a surface of each of the plurality of laminations;
each of a plurality of strain measurement devices mounted on corresponding flat surfaces of the plurality of flat surfaces milled into the surface of each of the plurality of laminations, wherein the plurality of flat surfaces each comprise a single flat area having a distinct orientation from each other and sized for placement of at least one of the plurality of strain measurement devices; and
a control facility communicatively coupled with one or more of the plurality of strain measurement devices.

2. The system of claim 1, wherein a wire is coupled with the plurality of strain measurement devices and extends from a first end of the electric submersible pump through a length of the conveyance.

3. The system of claim 2, wherein the plurality of strain measurement devices are coupled to one another via the wire.

4. The system of claim 1, wherein the plurality of strain measurement devices are operable to record strain placed on the electric submersible pump.

5. The system of claim 4, wherein the control facility is operable to analyze strain data received from the plurality of strain measurement devices.

6. A method for determining bend within a wellbore, the method comprising:
laser welding a plurality of laminations of predetermined length to an electric submersible pump at one or more locations of the electric submersible pump;
milling a plurality of flat surfaces, wherein each of the plurality of flat surfaces comprises a single flat area having a distinct orientation from each other;
mounting corresponding strain measurement devices of a plurality of strain measurement devices to corresponding flat surfaces of the plurality of flat surfaces of the electric submersible pump, wherein the corresponding single flat area of each of the plurality of flat surfaces is sized for placement of the corresponding strain measurement devices of the plurality of strain measurement devices;
lowering, via a conveyance, the electric submersible pump into the wellbore; receiving, at a control facility, strain data from at least one of the plurality of strain measurement devices;
analyzing, via a computing device, the strain data; and
adjusting a position of the electric submersible pump based on the strain data.

7. The method of claim 6, further comprising running a wire from a first end of the electric submersible pump, along a length of the electric submersible pump, and through the conveyance.

8. The method of claim 7, wherein each of the plurality of strain measurement devices are coupled to one another via the wire.

9. The method of claim 6, further comprising calibrating the plurality of strain measurement devices prior to lowering the electric submersible pump into the wellbore.

10. The method of claim 6, further comprising adjusting a trajectory of the electric submersible pump based on the analyzed strain data.

11. The method of claim 6, wherein when the electric submersible pump is a wellbore operational tool, further comprising moving the electric submersible pump to a different location within the wellbore prior to operating the electric submersible pump.

12. A wellbore environment comprising:
an electric submersible pump coupled with a conveyance and operable to be disposed within a wellbore;
a plurality of laminations of predetermined length that are laser welded together at one or more locations of the electric submersible pump;
a plurality of flat surfaces milled into a surface of each of the plurality of laminations;
a plurality of strain measurement devices mounted on corresponding flat surfaces of the plurality of flat surfaces milled into the surface of each of the plurality of laminations, wherein the plurality of flat surfaces comprise a single flat area having a distinct orientation from each other and sized for placement of at least one of the plurality of strain measurement devices; and
a control facility communicatively coupled with at least one of the plurality of strain measurement devices.

13. The wellbore environment of claim 12, wherein at least one of the plurality of strain measurement devices is operable to record a degree of bend in the electric submersible pump as it moves throughout the wellbore.

14. The wellbore environment of claim 13, further comprising a computing device communicatively coupled with the control facility, the computing device further comprising at least one processor and a memory storing instructions thereon executable by the at least one processor to:
receive bend data from the at least one of the plurality of strain measurement devices via the control facility,
analyze the bend data to determine an amount of strain placed on the electric submersible pump, and
adjust a position of the electric submersible pump within the wellbore to reduce the amount of strain on the electric submersible pump.

15. The wellbore environment of claim 14,
wherein at least one of the plurality of strain measurement devices is a strain gauge, and
wherein the bend data includes a change in resistance as measured by the at least one strain gauge.

16. The wellbore environment of claim 14,
wherein the instructions further cause the processor to adjust a trajectory of the electric submersible pump within the wellbore.

* * * * *